United States Patent
Pawlowski

[19]

[11] Patent Number: 6,058,448
[45] Date of Patent: *May 2, 2000

[54] CIRCUIT FOR PREVENTING BUS CONTENTION

[75] Inventor: J. Thomas Pawlowski, Boise, Id.

[73] Assignee: Micron Technology, Inc., Boise, Id.

[ * ] Notice: This patent issued on a continued prosecution application filed under 37 CFR 1.53(d), and is subject to the twenty year patent term provisions of 35 U.S.C. 154(a)(2).

[21] Appl. No.: 08/574,771

[22] Filed: Dec. 19, 1995

[51] Int. Cl.$^7$ ........................................... G06F 13/36
[52] U.S. Cl. ................... 710/107; 710/108; 365/230.06; 365/233; 365/236; 365/189.05
[58] Field of Search ........................ 395/287, 725, 395/288, 200.14; 364/200; 370/85.1; 365/189.05, 236, 233, 230.06; 710/107, 108

[56] References Cited

U.S. PATENT DOCUMENTS

| | | |
|---|---|---|
| 5,086,427 | 2/1992 | Whittaker et al. . |
| 5,313,594 | 5/1994 | Wakerly ................................. 395/325 |
| 5,384,737 | 1/1995 | Childs et al. . |
| 5,416,739 | 5/1995 | Wong ................................. 365/189.01 |
| 5,428,797 | 6/1995 | Yamamura et al. ..................... 395/725 |
| 5,444,858 | 8/1995 | Wakerly ................................. 395/304 |
| 5,548,728 | 8/1996 | Danknick . |
| 5,553,246 | 9/1996 | Suzuki . |
| 5,559,753 | 9/1996 | Kocis . |

OTHER PUBLICATIONS

Author unknown, 1993, *1994 SRAM Data Book*, pp. 5–9 to 5–12, USA.

*Primary Examiner*—Ayaz R. Sheikh
*Assistant Examiner*—Rupal Dharia
*Attorney, Agent, or Firm*—Kirkpatrick & Lockhart LLP

[57] ABSTRACT

A circuit for controlling the data transmissions among two devices capable transmitting information, via an output buffer, over a bus, so as to prevent bus contention, is comprised of a first device enabled circuit for generating a first device enabled signal indicative of whether one of the devices is enabled to transmit information. A second device enabled circuit generates a second device enabled signal indicative of whether the other of the devices is enabled to transmit information. A circuit, which is in communication with the first and second device enabled circuits, generates an output enable signal. The output enable signal is input to one of the devices to create a delay between the end of a transmission of information by one device and the beginning of a transmission by the other device.

17 Claims, 4 Drawing Sheets

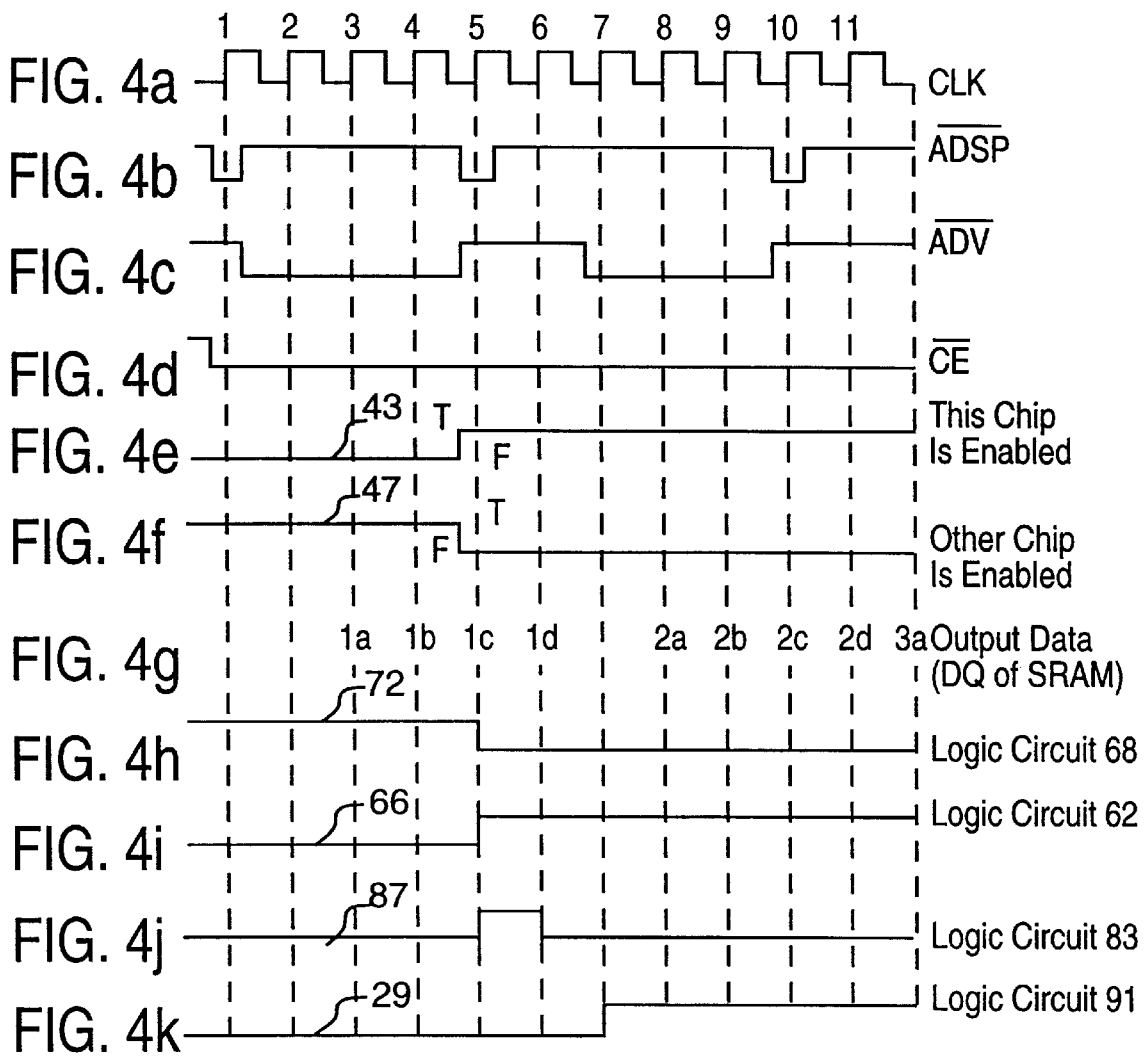

CIRCUIT FOR PREVENTING BUS CONTENTION

BACKGROUND OF THE INVENTION

1. Field of the Invention

The present invention is directed generally to a circuit for preventing bus contention, and, more particularly, to preventing bus contention problems in solid state stacked memories.

2. Description of the Background

In computer circuits, stacking is a process by which a number of relatively small devices are combined in a manner so that the small devices, collectively, emulate a larger device. Stacking can be either depth-expanded or width-expanded. In a simple example of stacking involving a random access memory (RAM), eight 1-bit RAMs, each having an input terminal, an output terminal, and an enable terminal, may be combined to emulate a single, 8-bit RAM. In such a case, the input terminals of each 1-bit RAM are tied together to form a common input terminal for the 8-bit RAM. Likewise, the output terminals of each 1-bit RAM are tied together to form a common output terminal for the 8-bit RAM.

For the collective device to function properly, only one individual 1-bit RAM can read or write from the shared terminals at any given time. That is typically accomplished by using logic circuits to decode address data and to provide an enable signal to only one 1-bit RAM at any given time.

Bus contention occurs when more than one device attempts to transmit information on the data bus at the same time. Bus contention can result when RAMs manufactured by different companies are stacked. That is because significant variations in timing parameters and tolerances exist between manufacturers.

The most visible result of bus contention is noise on power-supply lines and data lines connecting the devices. Another result of bus contention is loss of data during the period of contention. If one RAM is trying to drive the data bus high, while another RAM is trying to drive the data bus low, then the RAMs will be working against each other, data will be lost, and components in the circuit may be damaged from excessive current, known as "overcurrent". CMOS latch-up can result if the overcurrent is sufficiently high. If bipolar devices are used, damage can result because bipolar devices are not inherently self-current limiting. As a result, a feedback cycle can be initiated in which current through a bipolar transistor increases, the transistor heats up and its gain increases, causing further increases in current, heat, and gain. A phenomenon known as "thermal runaway" occurs when that feedback cycle results in current reaching a destructive level.

In the past, such bus contention could be avoided by insuring that all RAMs used in a stacking arrangement were manufactured by the same company, thereby ensuring nearly identical performance from all devices. Presently, however bus contention is becoming a significant concern even when RAMs from the same manufacturer are used. That is because clock speeds are increasing to the point that even the manufacturing tolerances between RAMs from the same manufacturer are significant enough to cause bus contention in a stacked RAM array. In other words, the margin of error in modern computers has decreased to the point that the variations that occur between RAMs in the same manufacturing process are sufficient to cause bus contention. Thus, the need exists for a device to eliminate bus contention problems.

SUMMARY OF THE INVENTION

The present invention is directed to a circuit for controlling the data transmissions among two devices capable of transmitting information, via an output buffer, over a bus, so as to prevent bus contention. The circuit is comprised of a first device enabled circuit for generating a first device enabled signal indicative of whether one of the devices is enabled to transmit information. A second device enabled circuit generates a second device enabled signal indicative of whether the other of the devices is enabled to transmit information. A circuit, which is in communication with the first and second device enabled circuits, generates an output enable signal. The output enable signal is input to one of the devices to create a delay between the end of a transmission of information by one device and the beginning of a transmission by the other device.

The circuit of the present invention may be carried onboard a memory device. The memory device is comprised of a first device enabled circuit for generating a first device enabled signal indicative of whether the memory device is enabled to transmit information. A second device enabled circuit generates a second device enabled signal indicative of whether another device is enabled to transmit information. A control circuit, in communication with the first and second device enabled circuits, generates an output enable signal to create a delay between the end of a transmission of information by another device and the beginning of a transmission of data by the memory device. The memory device additionally comprises a memory array, a circuit for receiving information from a data bus, a circuit for writing, responsive to the circuit for receiving, for writing information to the memory array, a circuit for reading information from the memory array, and an output circuit for transmitting, responsive to both the circuit for reading information and the control circuit, for transmitting information on the data bus.

The present invention solves the problem of bus contention between stacked RAMs by providing a delay between the beginning of a transmission by one device and the end of a transmission by another device. For example, by providing an additional clock cycle between the time one stacked RAM is expected to stop driving the data bus and when another stacked RAM is expected to begin driving the data bus, bus contention is eliminated. In that way, bus contention that would be caused by one stacked RAM driving the data bus too late, or by one stacked RAM driving the data bus too soon, or both, is avoided by a one clock cycle buffer between the transition from one stacked RAM to another. Those and other advantages and benefits of the present invention will become apparent from the description of the preferred embodiments hereinbelow.

BRIEF DESCRIPTION OF THE DRAWINGS

For the present invention to be clearly understood and readily practiced, the present invention will be described in conjunction with the following figures, wherein:

FIGS. 4a through 4k are timing diagrams showing signals within the control circuit.

DESCRIPTION OF THE PREFERRED EMBODIMENTS

Figure 1:
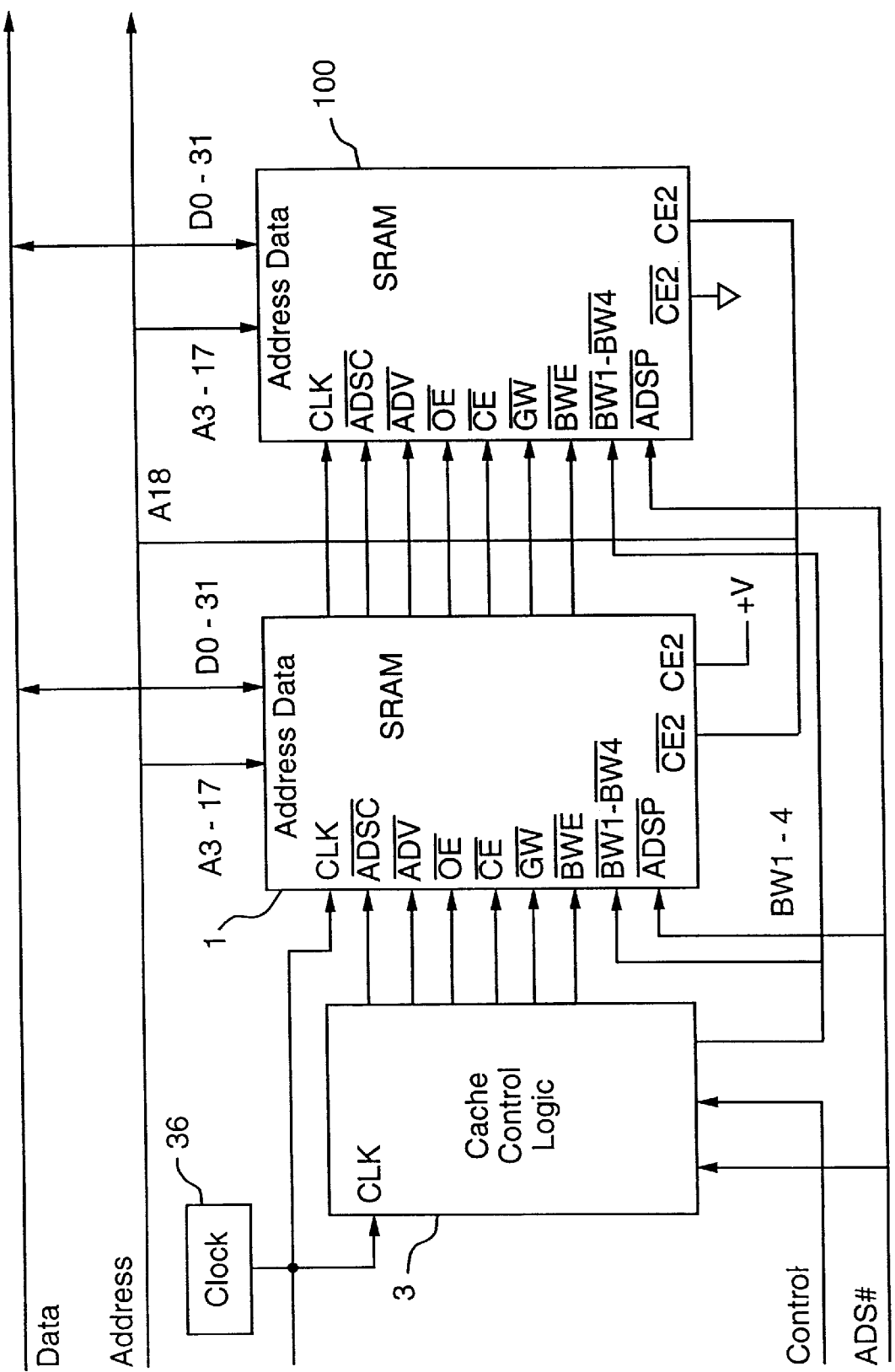
FIG. 1 is a block diagram illustrating a two element, depth-expanded, stacked RAM array.

FIG. 1 shows a memory circuit 1 in a depth-expanded stack with another memory circuit 100. Such a combination is well known by those of ordinary skill in the art. The circuits 1, 100 share common address lines A3–17, data lines D0–31, clock; signal CLK, and control signals. The control signals are provided by a cache control logic unit (CCL) 3, implemented by an application specific integrated circuit (ASIC). The circuits 1, 100 are enabled by an address line A18 via chip enable terminals $\overline{CE2}$ and $\overline{CE2}$, respectively. As can be seen from FIG. 1, when the value of address line A18 is low, one circuit 1 is selected, while when the value of address line A18 is high, the other circuit 100 is selected. This design, as is well known in the art, can be expanded to accommodate many more than the two circuits 1 and 100.

Figure 2:
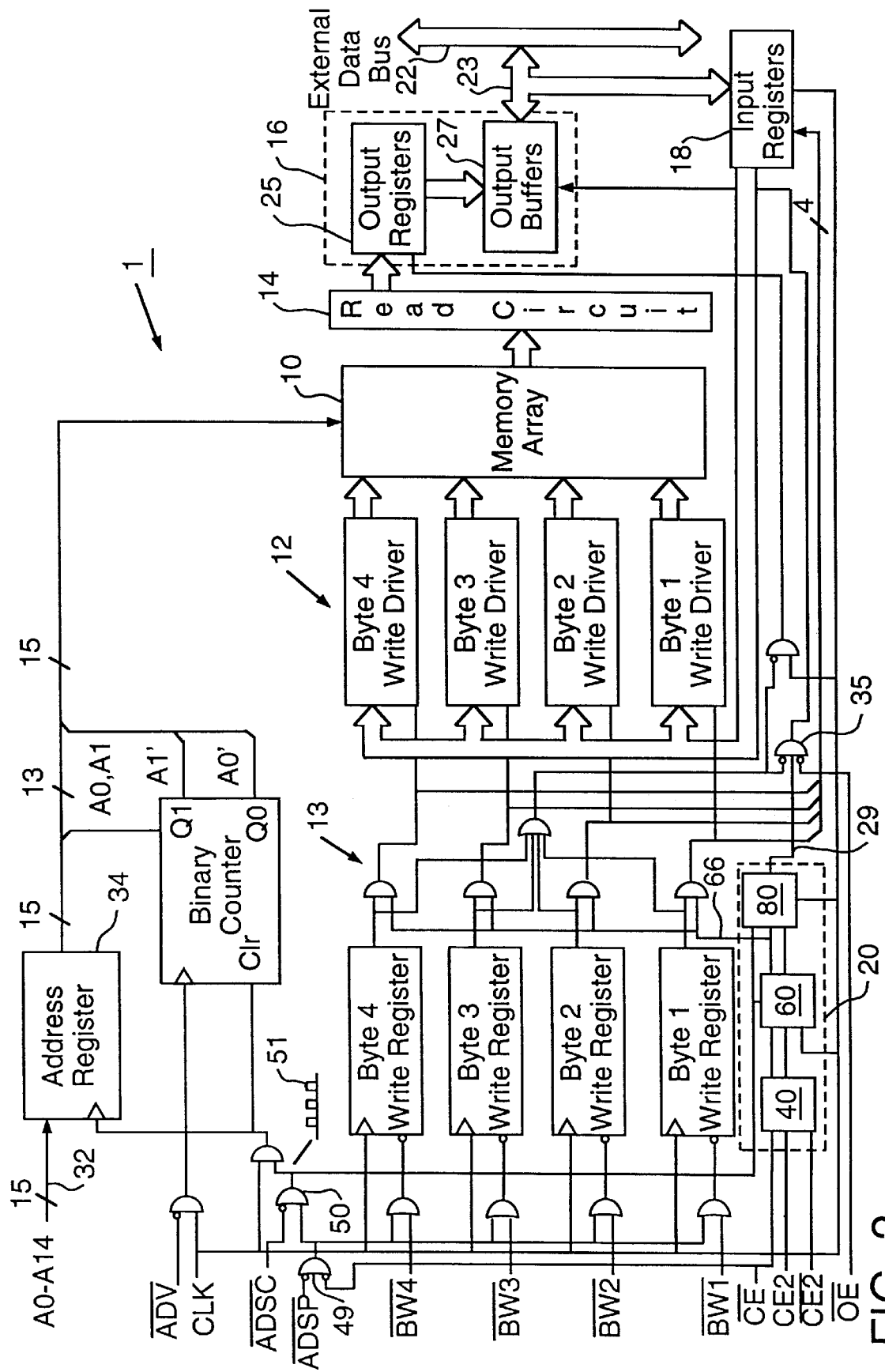
FIG. 2 is a combination block diagram and circuit schematic illustrating a RAM, constructed according to the present invention, of the type used in the stacked array of FIG. 1.

FIG. 2 is a simplified block diagram illustrating a preferred embodiment of the present invention in the context of the static RAM (SRAM) circuit 1 which is used in the synchronous, depth-expanded, architecture of the type shown in FIG. 1. It is to be understood that the circuit 1, illustrated in FIG. 2, has been simplified to illustrate only those aspects of the circuit 1 relevant to the present invention, while eliminating, for purposes of clarity, many of the elements found in a typical synchronous SRAM circuit. Those of ordinary skill in the art will recognize that other elements are required to produce an operational synchronous SRAM circuit. However, because such elements are well known in the art, and because they do not relate to the architecture which is the subject of the present invention, a discussion of such elements is not provided herein.

The circuit 1 illustrated in FIG. 2 is intended to be implemented on a single integrated circuit chip. The circuit 1 is comprised of a memory array 10 providing the primary data storage area. The memory array 10 may be static RAM (SRAM) or dynamic RAM (DRAM), but is preferably SRAM.

The memory array 10 is in communication with write circuit 12 for writing information to the array 10. Write circuit 12 comprises a plurality of write drivers, with each write driver assigned to a one byte wide portion of the array 10. Write circuit 12 is responsive to input registers 18 which receive information from an external data bus 22 through an internal data bus 23. A read circuit 14 for reading information from the memory array 10 is also provided. The read circuit 14 is in communication with the memory array 10, and is comprised of sense amplifiers. Read circuit 14 is also in communication with a transmitting circuit 16 for transmitting information over the internal data bus 23 to external data bus 22. The transmitting circuit 16 includes output registers 25 and output buffers 27, responsive to the read circuit 14, for outputting information over the internal data bus 23. The output registers 25, however, are used only in a pipelined implementation of the invention, and they function in a manner that is well known in the art of pipelined information transfer. In a non-pipelined implementation, the output registers 25 are not present in the transmitting circuit 16, and the read circuit 14 is in direct communication with the output buffers 27.

The CCL 3 acts as an interface between the SRAM circuit 1 and a processor (not shown). The active low synchronous address status controller signal $\overline{ADSC}$ and the active low synchronous address status processor signal $\overline{ADSP}$ are interrupt signals which cause a new address on an address bus 32 to be registered in an address register 34. The active low chip enable signal $\overline{CE}$ is indicative of whether the circuit 1 is selected to transmit and receive data. The chip enable 2 signal, present in both active low and active high forms $\overline{CE2}$ and CE2, is indicative of whether the other circuit 100 is selected to transmit and receive data.

Also provided is a control circuit 20. The control circuit 20 operates in conjunction with two logic gates 49 and 50. The logic gates 49 and 50 receive the known control signals $\overline{ADSC}$, $\overline{ADSP}$, and $\overline{CE}$ and combine the signals, as shown in FIG. 2, to produce an output signal 51. The control circuit 20 receives known control signals $\overline{CE}$, CE2 and $\overline{CE2}$, as well as the signal 51.

The control circuit 20 determines when the transmitting circuit 16 is to be enabled by supplying an output enable signal 29, which propagates through a logic gate 35 at the appropriate time, to the output buffers 27. Preferably, the control circuit 20 also determines when the write circuit 12 is to be enabled, and a first device enabled signal 66 acts to enable the write circuit 12, via a logic circuit 13, at the appropriate time.

Figure 3:
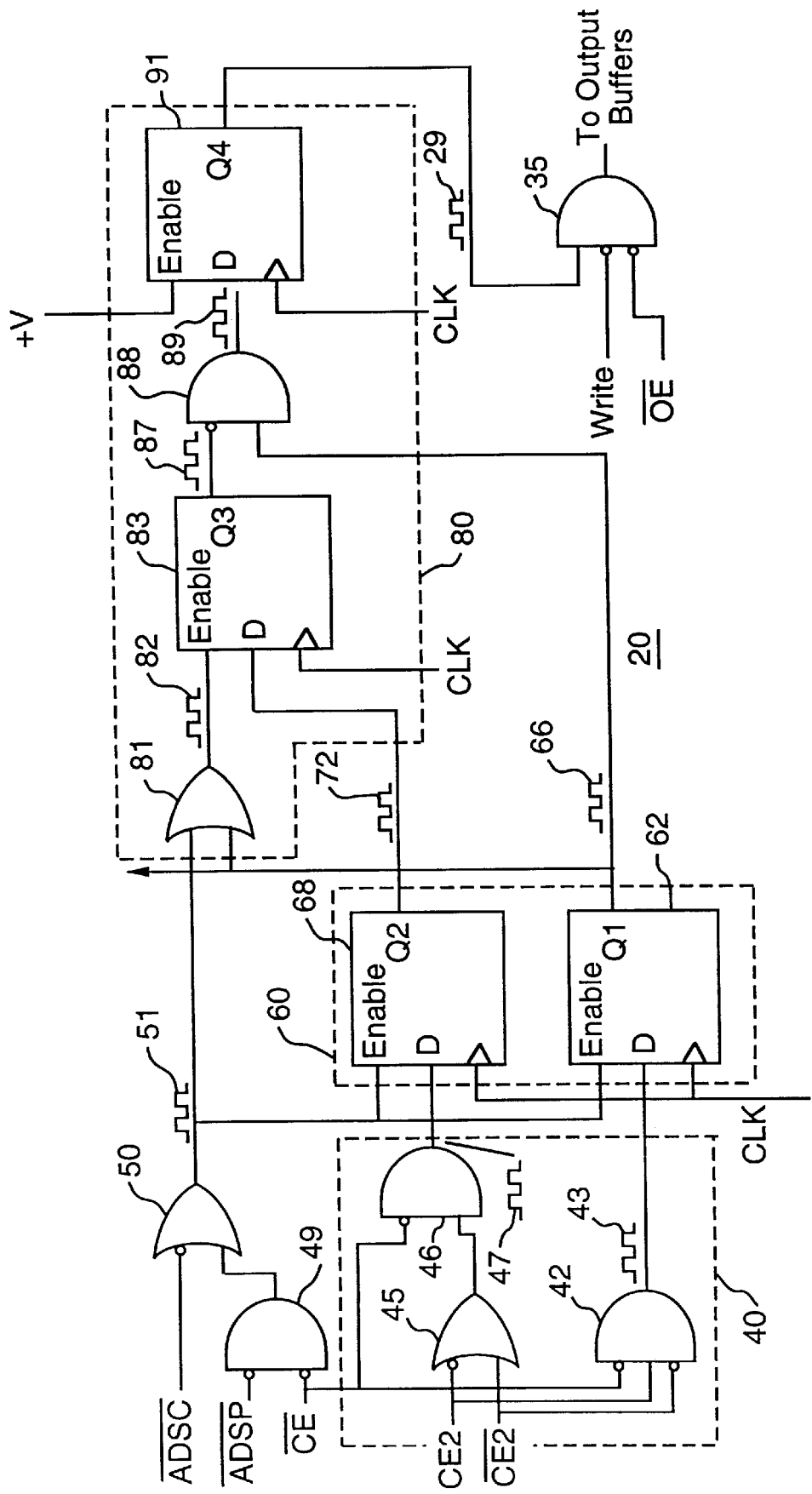
FIG. 3 is a circuit diagram of the control circuit of the present invention.

FIG. 3 shows that the control circuit 20 is comprised of a logic portion 40, a control portion 60, and a switchover delay portion 80. Logic portion 40 receives control signals $\overline{CE}$, CE2, and $\overline{CE2}$, processes the control signals through logic gates 42, 45, and 46, and produces output signals 43 and 47.

More specifically, in the logic control portion 40, the logic gate 42 is an AND gate that has a non-inverting input terminal which receives the CE2 signal, two inverting input terminals which receive the $\overline{CE}$ signal and the $\overline{CE2}$ signal, and an output terminal at which the first control signal 43 is available. The first control signal 43 is indicative of whether the circuit 1 is selected to transmit and receive information on the external data bus 22.

The logic gate 45 is an OR gate and the logic gate 46 is an AND gate. The OR gate 45 has an inverting input terminal at which the CE2 signal is received, a non-inverting input terminal at which the $\overline{CE2}$ signal is received, and an output terminal at which an output signal is available. That output signal is provided as an input signal to a non-inverting input terminal of AND gate 46. The AND gate 46 also has an inverting input terminal which receives the $\overline{CE}$ signal, and an output terminal at which the second control signal 47 is available. The second control signal 47 is indicative of whether the other circuit 100 is selected to transmit and receive information on the external data bus 22.

As previously mentioned, the AND gate 49 and the OR gate 50 process the $\overline{CE}$, $\overline{ADSP}$, and $\overline{ADSC}$ signals to generate the output signal 51, referred to as flip-flop enable signal 51. More particularly, the AND gate 49 has two inverting input terminals and an output terminal. The $\overline{ADSP}$ signal and the $\overline{CE}$ signal are input to the inverting input terminals. The AND gate 49 generates an output signal which is available at the output terminal thereof and which is input to a non-inverting input terminal of the OR gate 50. The OR gate 50 also has an inverting input terminal and an output terminal. The $\overline{ADSC}$ signal is input to the inverting input terminal and the signal available at the output terminal thereof is the signal 51, referred to as the flip-flop enable signal. The flip-flop enable signal 51 is input to two flip-flops 62 and 68.

The control portion 60 is comprised of the flip-flop 62 and the flip-flop 68. The flip-flop 62 has an enable terminal which receives the flip-flop enable signal 51, an input terminal which receives the first control signal 43, and an output terminal Q1 at which the first device enabled signal 66 is available. If the flip-flop enable signal 51 is high, the flip-flop 62 is enabled to produce the first device enabled signal 66, and if the flip-flop enable signal 51 is low, the flip-flop 62 is disabled.

The flip-flop 68 has an enable terminal which receives the flip-flop enable signal 51, an input terminal which receives the second control signal 47, and an output terminal Q2 at which a second device enabled signal 72 is available. If the enable signal 51 is high, the flip-flop 68 is enabled to produce the second device enabled signal 72, and if the enable signal 51 is low, the flip-flop 68 is disabled.

The switchover and delay portion 80 is comprised of a logic gate 81, a flip-flop 83, a logic gate 88, and a flip-flop 91. The switchover and delay portion 80 generates the output enable signal 29 which, at the appropriate time, propagates through logic gate 35 to output buffers 27. The output enable signal 29 is timed such that there is a delay between the end of a transmission on the external data bus 22 by the other circuit 100, and the beginning of a transmission on the external data bus 22 by the circuit 1.

The logic gate 81 is an OR gate that has two non-inverting input terminals which receive the flip-flop enable signal 51 and the first device enabled signal 66, and an output terminal at which a flip-flop enable signal 82 is available.

The flip-flop 83 has an enable terminal which receives the flip-flop enable signal 82, an input terminal which receives the second device enabled signal 72, and an output terminal Q3 at which a switchover signal 87 is available. If the enable signal 82 is high, the flip-flop 83 is enabled to produce the switchover signal 87, and if the enable signal 82 is low, the flip-flop 83 is disabled.

The logic gate 88 is an AND gate that has an inverting input terminal which receives the switchover signal 87, a non-inverting input terminal which receives the first device enabled signal 66, and an output terminal at which a data signal 89 is available.

The flip-flop 91 has an input terminal which receives the data signal 89, an output terminal Q4 at which the output enable signal 29 is available, and an enable terminal which always receives a high signal so that the flip-flop 91 is always enabled. The output enable signal 29 is input at a non-inverting input terminal of the logic gate 35. Logic gate 35 has an inverting input terminal which receives a WRITE signal and another inverting input terminal which receives an $\overline{OE}$ signal.

Output enable signal 29 propagates through logic gate 35 when both a write to the memory array 10 is not in progress, as indicated by WRITE signal assuming a low state, and when the circuit 1 is enabled to transmit information, not receive information, as indicated by the $\overline{OE}$ signal assuming a low state. When the output enable signal 29 propagates through logic gate 35 it is input to an enable terminal of the output buffers 27, as shown in FIG. 2.

The flip-flops 62, 68, 83, and 91 are preferably D-type flip-flops. Other types of flip-flops, of course, may be used.

The delay between the end of a transmission by the other circuit 100 and the beginning of a transmission by the circuit 1 is preferably one clock cycle. Other delays are, of course, possible. The delay may be increased by, for example, adding additional flip-flops in series with flip-flop 91. Each additional flip-flop will increase the delay by one clock cycle.

With reference to FIGS. 4a–4k, the logic states of various components in the control circuit 20 can be observed during a typical data transmission. The clock signal CLK shown in FIG. 4a is provided via the clock circuit 36, shown in FIG. 1, and the $\overline{ADSC}$ signal, not shown in FIGS. 4a–4k, is assumed to have a high value in this example.

The first control signal 43, shown in FIG. 4e, and second control signal 47, shown in FIG. 4f, are received by the input terminals of the flip-flops 62 and 68, respectively. The first control signal 43 is indicative of whether the circuit 1 is selected to transmit information on the external data bus 22. When the first control signal 43 is low, the circuit 1 is not selected to transmit information on the external data bus 22, and when the first control signal 43 is high, the circuit 1 is selected to transmit information on the external data bus 22. As can be seen in FIG. 4e, the circuit 1 is selected to transmit information on the external data bus 22 just before the rising edge of clock cycle 5.

Likewise, the second control signal 47 is indicative of whether the other circuit 100 is selected to transmit information on the external data bus 22. When the second control signal 47 is low, the other circuit 100 is not selected to transmit data on the external data bus 22, and when the second control signal 47 is high, the other circuit 100 is selected to transmit data on the external data bus 22. As can be seen in FIG. 4f, the other circuit 100 is selected to transmit information on the external data bus 22 until just before the rising edge of clock cycle 5.

The output enable signal 29, as seen in FIG. 4k, is indicative of whether the circuit 1 is enabled to transmit information on the external data bus 22. When the output enable signal 29 is low, the circuit 1 is not enabled, and when the output enable signal 29 is high, the circuit 1 is enabled. As seen in FIGS. 2 and 3, if the output enable signal 29 is high, the transmitting circuit 16 will be enabled, provided a write is not in progress, as indicated by a low value for the WRITE signal, and a low value for the $\overline{OE}$ signal. Those conditions are checked by logic gate 35.

In FIGS. 4e and 4f, with reference to the first and second control signals 43 and 47, respectively, beginning at clock cycle 1, the circuit 1 is not selected to transmit information on the external data bus 22. The other circuit 100, however, is selected to transmit. A four part transmission, during clock cycles 3–6, by other circuit 100, is shown as 1a, 1b, 1c, and 1d in FIG. 4g.

During clock cycles 1 through 4, and as a result of the low value of first control signal 43, first device enabled signal 66, as shown in FIG. 4i, has a low value. Therefore, a low value results at the input terminal of the flip-flop 91. Atn: the same time, and as a result of the high value of second control signal 47, the second device enabled signal 72 has a high value.

Just before the rising edge of clock cycle 5, the first control signal 43 changes state from a low value to a high value, indicating that the circuit 1 has been selected to transmit information on the external data bus 22. At the same time, the second control signal 47 changes state from a high value to a low value, indicating that the other circuit 100 has not been selected to transmit information on the external data bus 22. The first and second control signals 43 and 47 are present on the input terminals of the flip-flops 62 and 68, respectively, at the rising edge of clock cycle 5. As a result, the first device enabled signal 66, shown in FIG. 4i, changes state from a low value to a high value at the rising edge of clock cycle 5. Conversely, the second device enabled signal 72, shown in FIG. 4h, changes state from a high value to a low value at the rising edge of clock cycle 5. As a result of the low value of the $\overline{ADSP}$ signal, the low value of the CE signal, and the high value of first device enabled signal 66, the flip-flop 83 is enabled beginning at clock cycle 5 as shown by FIG. 4j. During clock cycle 5, switchover signal 87 has a high value. The high value of switchover signal 87 is a result of the high value of second device enabled signal 72, present at input terminal 85 until the rising edge of clock cycle 5. A low value of switchover signal 87 ensures that a low value will be present at the input terminal of flip-flop 91, thereby ensuring that the circuit 1 will not yet be enabled.

At the rising edge of clock cycle 6, switchover signal 87 changes from a high value to a low value in response to the low value of second device enabled signal 72 present at the input terminal of flip-flop 83. As a result of the low value of switchover signal 87 and the high value of first device enabled signal 66 present at the AND gate 88, the flip-flop data signal 89 has a high value. Therefore, at the rising edge of clock cycle 7, output enable signal 29, which is available at output terminal 93 of flip-flop 91, and which is shown in FIG. 4k, changes from a low value to a high value.

At this point, assuming that the signals needed to allow output enable signal 29 to propagate through logic gate 35 are present, the output buffers 27 will be enabled. In the example shown in FIG. 4, the output buffers 27 are enabled, and a transmission begins at clock cycle 8, as seen in FIG. 4g. A four part transmission is shown as 2a, 2b, 2c, and 2d. The first part of an additional transmission by the circuit 1 is shown as 3a in FIG. 4g.

It should be noted that there is no delay between successive transmissions by the same circuit, for example, between data transmissions 2d and 3a. There is, however, a one clock cycle delay between the last data transmission 1d by other circuit 100 and the first data transmission 2a by the circuit 1.

Those of ordinary skill in the art will recognize that many modifications and variations of the present invention may be implemented. For example, the control circuit 20 of the present invention may be implemented in a manner that prevents bus contention among more than two circuits. Likewise, the invention may be implemented external to one or more memory circuits and the invention may be implemented with one or more conventional memory devices. The foregoing description and the following claims are intended to cover all such modifications and variations.

What is claimed is:

1. A control circuit for a first device that may be connected to a shared bus, comprising:
   a first device enabled circuit including a first flip-flop having a data input terminal for connection to a signal indicative of whether the first device is selected to transmit data to the bus;
   a second device enabled circuit including a second flip-flop having a data input terminal for connection to a signal indicative of whether a second device is selected to transmit data to the bus; and
   a switchover and delay circuit to create a predetermined delay of at least one clock cycle after an end of a transmission of data by the second device and a beginning of a transmission of data by the first device, the switchover and delay circuit including:
      a third flip-flop having a data input terminal connected to an output terminal of the second flip-flop;
      a logic circuit having a first input terminal connected to an output terminal of the third flip-flop and a second input terminal connected to an output terminal of the first flip-flop; and
      a fourth flip-flop having a data input terminal connected to an output terminal of the logic circuit and an output terminal connected to an enable terminal of an output buffer of the first device.

2. The circuit of claim 1, wherein the logic circuit includes an AND gate having an inverting input terminal connected to the output terminal of the third flip-flop, a non-inverting input terminal connected to the output terminal of the first flip-flop, and an output terminal connected to the data input terminal of the fourth flip-flop.

3. The circuit of claim 1, wherein the first flip-flop includes an enable terminal connected to an output terminal of a second logic circuit.

4. The circuit of claim 3, wherein the second flip-flop includes an enable terminal connected to the output terminal of the second logic circuit.

5. The circuit of claim 4, wherein the third flip-flop includes an enable terminal connected to the output terminal of the second logic circuit.

6. The circuit of claim 5, wherein the enable terminal of the third flip-flop is connected to the output terminal of the second logic circuit via a third logic circuit.

7. The circuit of claim 1, wherein the output terminal of the fourth flip-flop is connected to an enable terminal of the output buffer via a fourth logic circuit.

8. The control circuit of claim 3, wherein the second logic circuit includes:
   an AND gate including a first inverting input terminal connected to an address status processor line, a second inverting input terminal for connection to the signal indicative of whether the first memory device is selected to transmit data to the data bus, and an output terminal; and
   an OR gate having an inverting input terminal connected to an address status controller line, a non-inverting input terminal connected to the output terminal of the AND gate of the second logic circuit, and an output terminal connected to the enable terminal of the first flip-flop.

9. The control circuit of claim 6, wherein the third logic circuit includes a first input terminal connected to the output terminal of the second logic circuit, a second input terminal connected to the output terminal of the first flip-flop, and an output tennis connected to the enable terminal of the third flip-flop.

10. A first memory device for transmitting data over a bus, comprising:
   a memory array;
   a read circuit connected to the memory array;
   a transmitting circuit including an output buffer connected between the read circuit and the bus;
   an input register connected to the bus;
   a write circuit connected to the input register; and
   a control circuit including:
      a first device enabled circuit including a first flip-flop having a data input terminal for connection to a signal indicative of whether the first memory device is selected to transmit data to the bus;
      a second device enabled circuit including a second flip-flop having a data input terminal for connection to a signal indicative of whether a second memory device is selected to transmit data to the bus; and
      a switchover and delay circuit to create a predetermined delay of at least one clock cycle after an end of a transmission of data by the second memory device and a beginning of a transmission of data by the first memory device, the switchover and delay circuit including:
         a third flip-flop having a data input terminal connected to an output terminal of the second flip-flop;
         a logic circuit having a first input terminal connected to an output terminal of the third flip-flop and a second input terminal connected to an output terminal of the first flip-flop; and a fourth flip-flop having a data input terminal connected to an output terminal of the logic circuit and an output terminal connected to an enable terminal of the output buffer of the transmitting circuit of the first memory device.

11. The memory device of claim 10, wherein the output terminal of the first flip-flop is connected to the write circuit.

12. The first memory device of claim 10, wherein the memory array includes a static random access memory array.

13. The first memory device of claim 10, wherein the memory array includes a dynamic random access memory array.

14. The memory device of claim 10, wherein the transmitting circuit includes an output register connected between the read circuit and the output buffer.

15. A memory circuit, comprising:

a cache control logic circuit;

a first memory device connected to the cache control logic circuit; and a second memory device connected to the cache control logic circuit and connected to the first memory device via data bus, the first memory device including:
  a memory array;
  a read circuit connected to the memory array;
  a transmitting circuit including an output buffer connected between the read circuit and the data bus;
  an input register connected to the data bus;
  a write circuit connected to the input register; and
  a control circuit including:
    a first device enabled circuit including a first flip-flop having a data input terminal for connection to a signal indicative of whether the first memory device is selected to transmit data to the data bus;
    a second device enabled circuit including a second flip-flop having a data input terminal for connection to a signal indicative of whether the second memory device is selected to transmit data to the bus; and
    a switchover and delay circuit to create a predetermined delay of at least one clock cycle after an end of a transmission of data by the second memory device and a beginning of a transmission of data by the first memory device, the switchover and delay circuit including:
      a third flip-flop having a data input terminal connected to an output terminal of the second flip-flop;
      a logic circuit having a first input terminal connected to an output terminal of the third flip-flop and a second input terminal connected to an output terminal of the first flip-flop; and
      a fourth flip-flop having a data input terminal connected to an output terminal of the logic circuit and an output terminal connected to a enable terminal of the output buffer of the transmitting circuit of the first memory device.

16. The memory circuit of claim 15, wherein the data input terminal of the first flip-flop is connected to an output terminal of the cache control logic circuit.

17. The memory circuit of claim 16, wherein the data input terminal of the second flip-flop is connected to the output terminal of the cache control logic circuit.

* * * * *

UNITED STATES PATENT AND TRADEMARK OFFICE
CERTIFICATE OF CORRECTION

PATENT NO. : 6,058,448
DATED : May 8, 2000
INVENTOR(S) : Pawlowski

Page 1 of 1

It is certified that error appears in the above-identified patent and that said Letters Patent is hereby corrected as shown below:

Column 1,
Line 56, immediately after the word "however", please insert the punctuation mark -- , --.

Column 3,
Line 7, immediately after the word "clock", please delete the punctuation mark -- ; --.

Line 11, after the word "and", please delete the designation "$\overline{CE2}$" and insert the designation -- CE2 -- therefor.

Column 6,
Line 44, before the words "the same", please delete "Atn:" and insert the word -- At -- therefor.
Line 63, please delete the designation "CE" and insert the designation -- $\overline{CE}$ -- therefor.

Column 8,
Line 38, after the word "output", please delete the word "tennis" and insert the word -- terminal -- therefor.

Column 10,
Line 23, after the words "connected to", please delete the article "a" and insert the article -- an -- therefor.

Signed and Sealed this

Twenty-ninth Day of January, 2002

Attest:

*Attesting Officer*

JAMES E. ROGAN
*Director of the United States Patent and Trademark Office*